Patented July 28, 1953

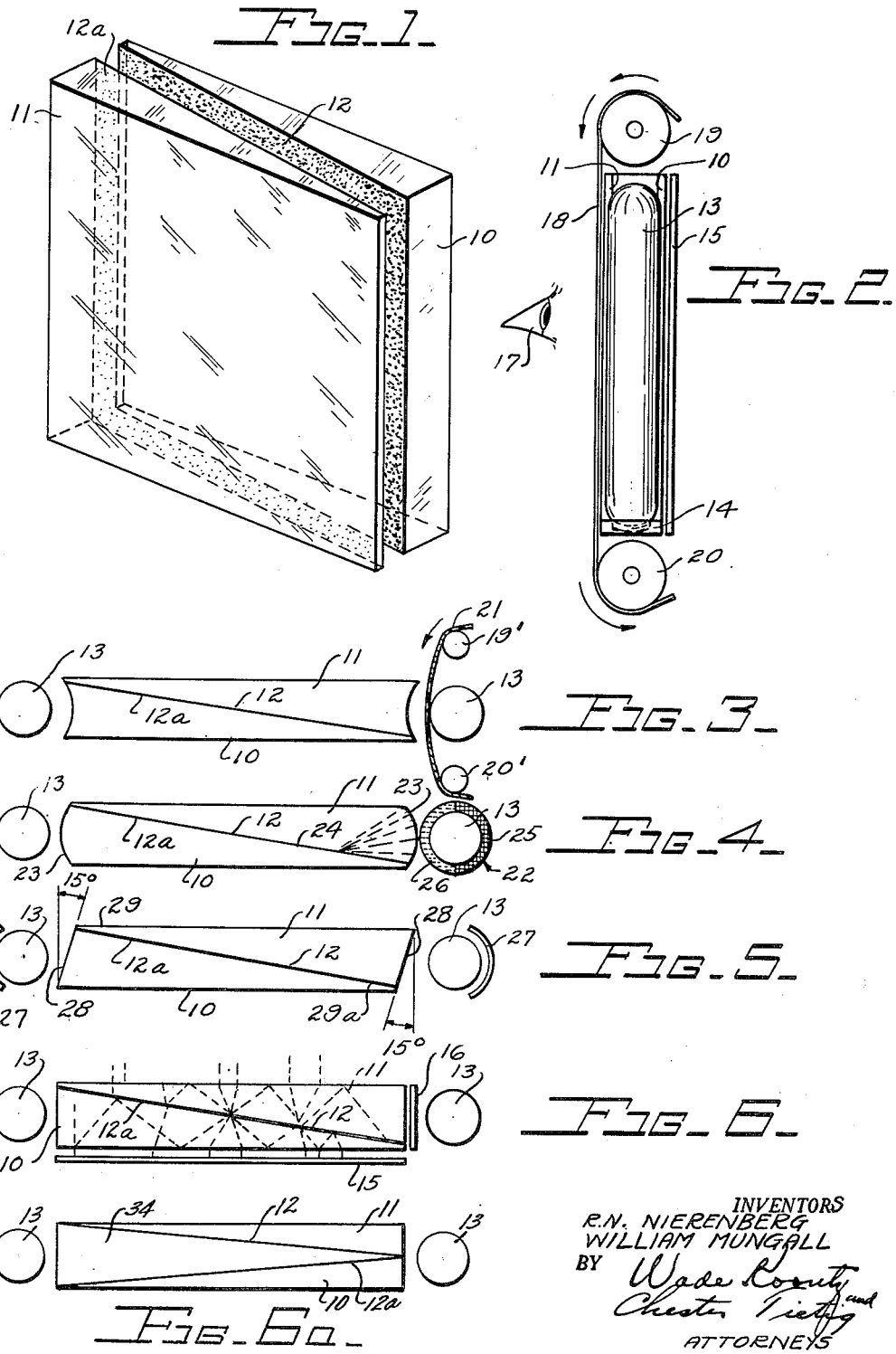

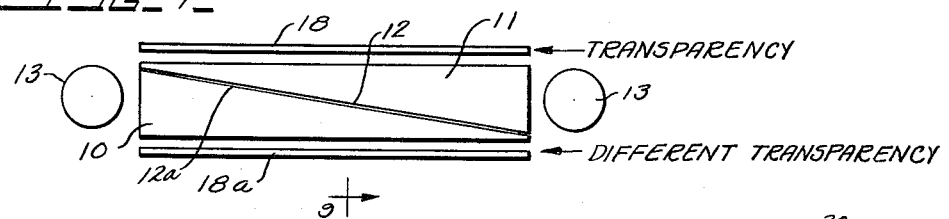
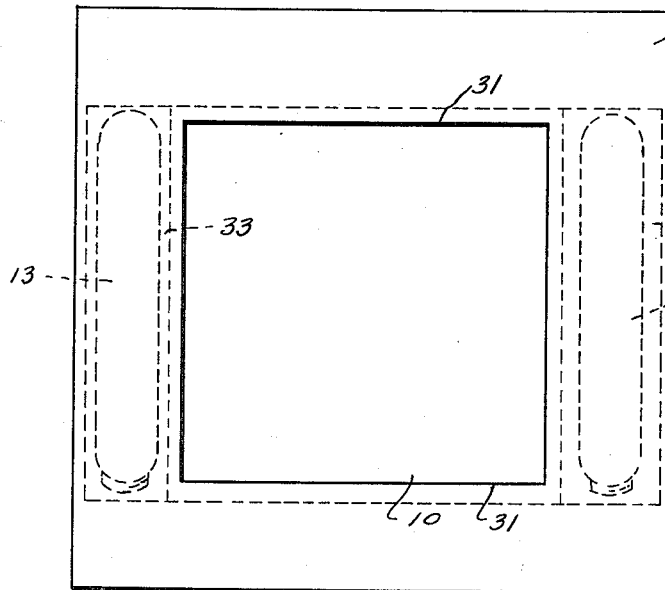
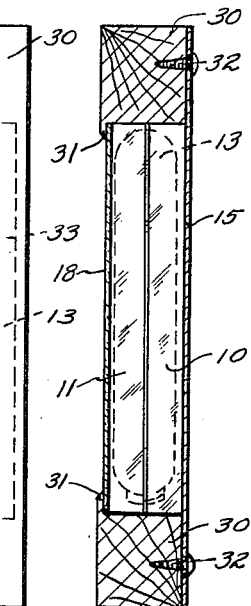
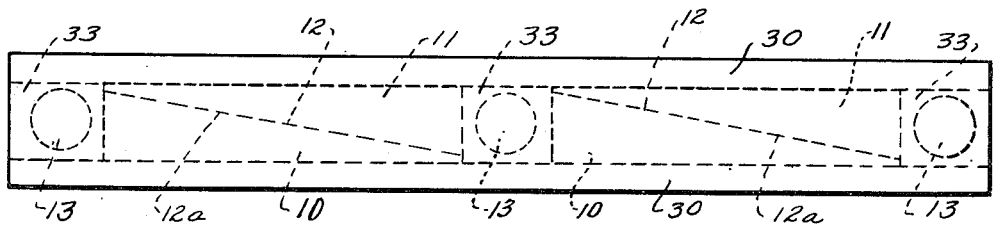

2,646,637

UNITED STATES PATENT OFFICE 2,646,637

DEVICE FOR TRANS-ILLUMINATING TRANSPARENCIES

Richard N. Nierenberg and William Mungall, Dayton, Ohio

Application January 26, 1950, Serial No. 140,701

8 Claims. (Cl. 40—86)

(Granted under Title 35, U. S. Code (1952), sec. 266)

The invention described herein may be manufactured and used by or for the Government for governmental purposes without payment to us of any royalty thereon.

This invention relates to a device for trans-illuminating transparencies. Such a device is of utility for viewing X-ray film, other photographic negatives, retouching photographic film and for numerous advertising uses. In the past, viewers for accomplishing the above objects can generally be made of a sheet of glass having one or more matte surfaces over which the negatives were placed, while the sources of light were usually arranged close behind the glass sheet. This leads to hot spots on the glass sheet which were, in many cases, the cause of deterioration of the negatives, or even in some cases, of fire. Edge lighting of glass or plastic sheets having a matte surface has also been attempted, but no satisfactory means of distributing the light uniformly across such a sheet has yet appeared. All of the prior art constructions were open to the objection that hot spots were created or the light intensity was otherwise uneven.

It is acknowledged that in the prior art, a wedge structure is disclosed in which total reflection is utilized for illuminating a diffusing surface, but the means for obtaining uniform illumination of the wedge is different from the present invention. In the previous device it is necessary to produce a matte surface having a graduated etch or an equivalent construction is employed. Such surface is extremely difficult to produce and it is believed that this difficulty, from which the present invention is free, has been the reason for the limited commercial success with which this prior device has been received.

The present invention, briefly described, comprises two or more wedges of a transparent plastic material which have the property of substantially total internal reflection. These wedges, at least one of which is a matte-surfaced face, are placed face-to-face to form a block and then are lighted by light sources arranged close to the bases of the wedges. Some means for holding the wedges together is employed and the transparency to be viewed may be placed either in front or in the rear of the block structure. While the intensity of the light is attenuated as it is transmitted through the wedge from the base to the tip by the phenomenon of total internal reflection, the attenuation in one wedge is substantially compensated by the increased light which the matte surface receives as the base of the other wedge is approached by the tip of the first. A substantially uniform field of illumination is therefore created by compensation between the light intensities of the two wedges to any point on the matte surface. The matte surface itself acts as a diffusing screen since each depression assists in scattering the light and assisting its egress from the wedge through the first thereof toward the observer's eye.

Among the objects of the invention besides those which have been above indicated, is to provide an illuminator which is especially adapted to view a travelling strip of positive film such as can be prepared from negatives made by the Sonne camera or other continuous-strip-photography creating means.

Another object is to provide an illuminator which is adapted to provide selective color effects, variable light emphasis effects and other effects valuable in advertising.

Another object is to provide illuminating different transparencies at the same time from the front and back of the viewer. Such a modification is of value for creating illuminated signs which change the message as soon as the observer passes a vertical line drawn through them to the ground.

Another object is to provide an illuminator which is adapted to the use of reflectors in positions where a great uniformity of reflection can be accomplished.

Another object of the invention is to provide an illuminator which is adapted to provide selective color effects, variable light emphasis effects and other effects valuable in advertising and in merchandising.

Another object is to provide, in one modification, means for illuminating different transparencies at the same time from the front and back of the viewer. Referring now to the drawings, Fig. 1 is a perspective view of the essential working parts of our illuminator or viewer, except for the light source;

Fig. 2 is an edge view of our illuminator showing the light sources, a rear reflector and means for traversing a strip film over the face of the illuminator;

Fig. 3 is a top view of a modification of the edge curvature of the essential wedges such as are shown in Fig. 1, having means of modifying the color of the light from the sources at the bases of the wedges.

Fig. 4 is a top view of another modification in which the edges of the wedges have lens properties enabling them to concentrate light at a se- 2,646,637

3 lected area between the sides of the illuminator;

Fig. 5 is a top view of another modification in which the wedges are cut with slanting sides for the purpose of giving them prism-like properties.

Fig. 6 corresponds to a top view of Fig. 2, the strip traversing means having been eliminated and a color filter having been positioned on the right hand side between the light source and the wedges;

Fig. 6a is a top view of a modification in which more than two wedges may be used;

Fig. 7 is another top view showing a modification in which different transparencies may be illuminated at the same time from the front and back of the illuminator;

Fig. 8 is a front elevation of our viewer provided with a holding means for the wedges and a recessed mounting for the sources of illumination;

Fig. 9 is a vertical section taken on the line 9 of Fig. 8 showing how the wedges are supported and held and one of the light sources is shown by dashed lines; and Fig. 10 is a top view of an arrangement of multiple viewers and multiple light sources, the arrangement being such that one light source is enabled to serve two viewers.

Returning to Fig. 1, at 10 and 11 are wedges made preferably of highly polished transparent material which has light-piping properties. The preferred material is clear methylmethacrylate resin, but other resins of the same general kind, for example, polystyrene, may be used. These resins are known in commerce as "Lucite" (methyl methacrylate), "Plexiglas" (methyl methacrylate) and "Styron" (polystyrene). The effect desired is obtainable from plate glass, but not to a high degree. The inner faces of both wedges 10 and 11 have roughened surfaces 12 which extend completely across the faces. This roughening is preferably produced by sand blasting, but can also be produced by grinding, sanding or etching. The width of the base of each wedge is essentially the light-gate or aperture stop of the system and this width, preferably, should be equal to or greater than the width of the light source. The wedges 10 and 11 are so fitted together that the inner or contiguous faces of each wedge are in contact and the more extensive edge or base will abut the thinner edge of the other. Consequently a block-like structure is produced, which in effect has an embedded matte surface extending from and through one corner obliquely to and through the other. The wedges 10 and 11 are preferably mechanically held together by any suitable means, one embodiment of which is shown in Figs. 8 and 9. However adhesive compositions may be employed in lieu of mechanical holding means, or both mechanical and adhesive means may be employed together. One or more electric incandescent or fluorescent lamps 13 are placed in appropriate electrical outlets 14 at the left and right edges of the block formed by the wedges 10 and 11.

The light that enters through the bases of each wedge traverse the wedge substantially by the optical phenomenon known as total internal reflection, but in so doing, the light rays impinge upon the roughened surfaces 12 or 12a of each wedge. Each depression of the roughened surfaces 12 or 12a intercepts one or more rays of light on their way through the plastic material, thereupon each roughened depression becomes essentially a new source of light due to the reflection and/or refraction. Since roughening extends over the entire inner faces 12 and 12a of each wedge the roughened surfaces present a

4 brightly illuminated area when viewed from either the front or rear surfaces of this composite block. At least one lamp 13, which is preferably a fluorescent lamp, is such as each wedge base since the employment of only one lamp per block would create an intolerable situation in that the intensity of the illumination would diminish rapidly from one side to the other. In the structure shown in the figures, the middle part of the wedges yields substantially the same amount of illumination as any other area of the viewing surfaces because the second lamp 13 and its associated wedge compensates for the falling off of illumination from the first lamp and its wedge from the wedge base to the opposite edge.

Referring now to Fig. 2 the reflector 15 is placed behind the wedge 10, the eye 17 of the observer being located in front of the wedge 11 although not so closely adjacent thereto as in Fig. 2. 18 is a transparency in strip form which may be an aerial strip photograph, a motion picture film or similar transparency. Means for causing a traverse of the transparency across the front surface of the wedge block of the transilluminator comprises an idler or storage roll 19 and a power or manually driven roll 20. Means for driving the power roll 20 are not shown since they are conventional. Using a strip aerial photograph, for example, the eye 17 of the observer can inspect the transilluminated scene as it traverses over the front of the wedge 11 and thus have the sensation of seeing the terrain as from a moving airplane. The strip 18 may be continuous for advertising or other purposes.

Color effects are obtainable in our trans-illuminator by devices shown in Fig. 3. On the right side of Fig. 3, 21 is a color filter which in the drawing is lined for three colors, i. e., from top to bottom, blue, red and green. In Fig. 3, 20' is a power or manually driven roll over which the flexible filter 21 is fed from or over idler roll 19'. Therefore the color of the light which makes its exit from the surface 12 of the wedge 11 of Fig. 3 will vary according to which color of the filter 21 is passing over the lamp 13 at any given instant.

As an alternative the lamp 13 may be provided with a revolving base (not shown) and the lamp itself provided with a relatively fixed transparent jacket made of colored plastic as shown in Fig. 4 of the drawings. If the lamp is rotated, the eye of the observer will see during the cycle of rotation colors as governed by the color or colors of the jacket. Change of color has advertising value, for example, for signs because it captures the attention. In Fig. 3 the wedge bases are made concave so that the lamps 13 can be set closer to them, thus decreasing the necessary width of the illuminator.

As shown in Fig. 4 the wedges 10 and 11 may have convexly rounded bases 23. The rotundity of the bases should have a regular curvature adapted to concentrate the light on the area desired. The curvature may be, for example, adapted to concentrate the entering light to focus upon a particular area on the surface 12, this area being 24. Area 24 may be emphasized by the provision of a plastic jacket 22 for the lamp 13 as shown at the right side of Fig. 4 in which one-half 25 of the jacket is opaque and the other half 26 transparent. When the lamp 13 is rotated, together with the jacket 22, the area 24 will be illuminated only during half or other fraction of the rotative cycle depending upon the extent of the opaque section 25, so that the observer's attention is drawn to the particular area 24, which is at the focal area of the rotundity 23 during the time that this area is illuminated.

Fig. 5 shows the use of curved reflectors behind the lamps 13. These reflectors 27 act as intensifiers in the conventional manner, but in conjunction with the slanted bases 28, which are a novelty in this figure. The light from the lamps 13 and reflectors 27 is bent by the fifteen degree angle at which the bases 28 depart from vertical. Consequently the parallel rays entering the wedge bases are bent parallel to the roughened wedge surfaces 12 and 12a for a greater length than would be the case if the bases 28 were not slanted. The result is that the bases 29 and 29a of the wedges 10 and 11, respectively, receive a greater amount of illumination than would be the case when straight bases, such as are shown in Figs. 1 and 6, would be employed, while fifteen degrees is approximately the best prismatic angle to employ for wedges having bases eight and one-half inches to ten and one-half inches long for the purpose of extending light transmission to the wedge tips, nevertheless, this angle may be varied according to the wedge length or the index of refraction of the material. The longer the wedges are, the more acute the angle should be when the wedges are in the position shown in Fig. 5.

In Fig. 6 the path of the light rays through the plastic material is shown by dashed lines. In that figure a reflector 15 is placed behind the wedge 10. The light rays are reflected from the roughened surfaces 12 and 12a to the reflector 15 and from it they leave the plastic material at the front face of the wedge 11. The reflector therefore acts as a light intensifier. The reflector 15 may be a mirror or a metallic foil or rigid surface. Colored transparent filters 16 may also be interposed between the lamps 13 and the bases of either or both wedges 10 and 11 whereby to drive monochromatic light from a multichromatic light source in the known manner or to compensate any color balance required by the light source or the transparency.

In Fig. 7 transparencies 18 and 18a are located in front of the faces of the wedges 11 and 10, respectively. These transparencies may be either of the still or of the traveling variety. It is not necessary for the two transparencies to be the same, or if they are the same, to be in register. Transparency 18 may bear entirely different subject matter than transparency 18a, and when viewed from either the front or the rear, the transparency toward the observer's eye will not be interfered with by the transparency at the rear of the wedge block, nor will the brightness of the front transparency be affected by the presence of the other transparency at the rear of the wedge block.

Referring to Figs. 8 and 9, an assembly is illustrated in which a structure 30, which resembles a picture frame, is provided for the dual purpose of holding the wedges together in operative relation and for housing the lamps 13 which are provided to transilluminate the wedges 10 and 11 through the bases thereof. In these figures the structure 30 may be a wooden frame of generally square or parallelogram shape like a picture frame inclosing the wedges 10 and 11 and a transparency 18 and holding them by flange 31 against a backing 15 which is preferably a reflector. Chambers 33 are provided at each vertical edge of the wedge block for the purpose of containing the light sources. Light is prevented from entering the observer's eye directly from the lamps 13 by the uninterrupted opaque surface of the structure 30.

However, this structure may be louvered at the rear of the lamps 13 for the purpose of promoting cooling of the lamps 13 by air convection or other ventilation. The structure may be assembled with a reflector 15 by screws 32 which enter the wood or other suitable material of structure 30 from the rear as shown in Fig. 9.

Fig. 10 shows a top view of a structure similar to that of Figs. 8 and 9 except that it is made multiple, the advantage being that a continuous succession of viewer assemblies may be retained within a structure 30 to provide a frieze of views for ornamenting, for example, the wall of a room. In this structure one lamp 13, mounted in its chamber 33, is enabled to cast its light in two directions into wedge bases 10 and 11, one being on respectively the right-hand and left-hand end side of its appropriate lamp 13 located between them. An economy of space, lamps and electric current is therefore realized by this construction and an artistic effect similar to an unbroken multiple picture frame is therefore realized for all of the transparencies presented from such an assembly.

Numerous changes may be made without departing from the spirit of the invention. For example, only one of the inclined faces of the two wedges 10 and 11 need be roughened, the other may remain polished. The wedges themselves may be colored, i. e., made from colored transparent plastic or glass. In Fig. 2 the transparencies may be arranged to travel from bottom to top, or from left to right, or right to left.

In the Fig. 3 structure, the lamps 13 may be set in the concave portion of the wedge bases so closely that they touch the bases; no transparency or jacket need be provided for them. Reflectors may be used behind the lamps 13 even though they are provided with single-color jackets or have filters 21 between them and the wedge bases.

In the Fig. 6a structure, the wedges 10 and 11 are arranged base adjacent to base while a third wedge 34 is disposed between them. In this structure, the base of the wedge 34 forms one side of a block-like structure and the two bases of the wedges 10 and 11 form the other side. Light sources 13 are disposed along both sides as in the other modifications. The wedge 34 may alternately itself consist of two wedges 34 and 34a. By such expedient, a block-like structure may be assembled from four wedges of substantially equal dimensions. Only one molding die would therefore be required.

We claim as our invention:

1. In a transilluminator, a wedge shaped block element of transparent plastic material having one face thereof uniformly roughened to provide a matte surface, a second wedge shaped block element of transparent plastic material having one face thereof uniformly roughened to provide a matte surface, said blocks being placed together with their matte surfaces in contacting relation to provide an illuminating block of substantially rectangular cross-section whereby substantially uniform total internal reflection obtains and illuminating means arranged adjacent the wide edge of each wedge shaped block whereby uniform illumination of the faces of the block obtains.

2. In a transilluminator, a wedge shaped transparent plastic element having an inclined plane uniformly roughened to provide a matte surface, a complementary wedge shaped element having an inclined plane uniformly roughened to provide a matte surface, said elements being positioned together with their matte surfaces in sealed contacting relation to form an illuminating block of substantially rectangular cross-section, the matte surfaces providing dust free reflecting surfaces and illuminating means arranged adjacent the wide edge of each element whereby a uniform illumination of both faces of the block obtains.

3. In a transilluminator, a wedge shaped transparent plastic element having an inclined plane uniformly roughened to provide a matte surface, a complementary wedge shaped transparent plastic element having an inclined plane, said elements being connected together with their inclined plane surfaces in sealed contacting relation to maintain said matte surface dust free, the connected wedge shaped elements forming an illuminating block of substantially rectangular cross-section, and illuminating means arranged adjacent the wide edge of each element whereby a uniform illumination of both faces of the block obtains.

4. The apparatus as set forth in claim 3 including a reflector mounted adjacent one of the faces of said block and arranged to reflect light derived from said illuminating means and projected out of said block back through the block to intensify the uniform illumination of the other face of said block.

5. The apparatus as set forth in claim 3 and an idler roll at one side of the illuminating block, a power driven roll at the opposite side thereof, and a transparency wound over both said rolls whereby the transparency may be traversed over the faces of the block formed by the wedge-shaped elements.

6. The apparatus as set forth in claim 3, the wedge-shaped elements having concave bases forming the sides of the block and the illuminating means arranged in nested relation in the sides so formed.

7. The apparatus as set forth in claim 3, each wedge element having a convex base forming the sides of the block, the illuminating means being of substantially cylindrical form and mounted to extend adjacent the edges of the block along the wedge bases substantially at the line of greatest convexity.

8. In a transilluminator, a wedge shaped block element of transparent plastic material having one face thereof uniformly roughened to form a matte surface, a second wedge shaped block element of transparent plastic material having one face thereof uniformly roughened, the respective wedges being secured together in sealing contacting relation to form a block with their matte surfaces therebetween, the cross section of the block presenting a parallelogram, the deviation from a rectangle being approximately 15°, and illuminating means arranged adjacent the wide edge of each element so joined whereby uniform illumination of the block obtains.

RICHARD N. NIERENBERG.
WILLIAM MUNGALL.

References Cited in the file of this patent

UNITED STATES PATENTS

| Number | Name | Date |
|---|---|---|
| 1,118,866 | Jones | Nov. 24, 1914 |
| 1,724,243 | Willey | Aug. 13, 1929 |
| 1,827,963 | Wompey | Oct. 20, 1931 |
| 2,126,729 | Bugge | Aug. 16, 1938 |
| 2,347,665 | Christensen et al. | May 2, 1944 |